United States Patent Office

3,562,329
Patented Feb. 9, 1971

3,562,329
DIBENZO[a,d]CYCLOHEPTEN-5-ONE OXIMES
Harry Louis Yale, New Brunswick, and Francis A. Sowinski, Edison, N.J., assignors, by mesne assignments, to E. R. Squibb & Sons, Inc., New York, N.Y., a corporation of Delaware
No Drawing. Application Jan. 22, 1965, Ser. No. 432,932, now Patent No. 3,448,102, dated Jan. 3, 1969, which is a division of abandoned application Ser. No. 266,011, Mar. 18, 1963. Divided and this application Nov. 29, 1968, Ser. No. 780,184
Int. Cl. C07c 131/08
U.S. Cl. 260—566    2 Claims

ABSTRACT OF THE DISCLOSURE

Dibenzo[a,d]cyclohepten-5-one oximes which are useful in the preparation of various 5-(substituted aminolower alkyl)-5,6-dihydrodibenz[b,f]azocines.

---

This application is a division of our application Ser. No. 432,932, filed Jan. 22, 1965, now Pat No. 3,448,102, which is in turn a division of our application Ser. No. 266,011, filed Mar. 18, 1963, now abandoned.

The invention relates to new basically substituted dihydrodibenzazocines (and their salts) having valuable therapeutic properties, processes for the preparation thereof, and new intermediates useful in such processes.

The therapeutically active compounds of this invention include dihydrodibenzazocines of the general Formula I:

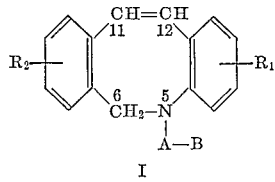

wherein A is a lower alkylene radical of at least two carbon atoms, B is a basic saturated nitrogen containing radical of less than twelve carbon atoms, $R_1$ and $R_2$ are the same or different and represent hydrogen, halogen, trihalolower alkyl and lower alkyl; and salts thereof.

Among the suitable radicals represented by the symbol B are: amino, (lower alkyl)amino; di(lower alkyl)amino, and basic saturated 5 to 7 membered n-heterocyclic radicals of less than twelve carbon atoms, as exemplified by piperidino, pyrrolidino, morpholino, piperazino, lower alkyl piperazino and homopiperazino.

The terms "lower alkyl" and "lower alkylene" as employed herein, include both straight and branched chain radicals of less than 8 carbon atoms. The particularly preferred compounds are those wherein A is a lower alkylene radical of two to three carbon atoms (i.e., ethylene, trimethylene-1,3, and propylene-1,2); B represents di(lower alkyl)amino, morpholino or piperidino, $R_1$ is in the 3-position and represents hydrogen, chloro or methyl, and $R_2$ is hydrogen.

As to the salts of the dihydrodibenzazocines, those coming within the purview of this invention include the acid addition salts, particularly, the non-toxic acid-addition salts. Acids useful for preparing the acid addition salts include, inter alia, inorganic acids, such as the hydrohalic acids (e.g., hydrochloric and hydrobromic acid), sulfuric acid and phosphoric acid, and organic acids, such as oxalic maleic, fumaric, tartaric, citric, pamoic and acetic acid.

The compounds of this invention are therapeutically active compounds which are utilizable as antiallergic, anticholinergic and analgesic agents. For these purposes they may be administered orally or parenterally in conventional dosage forms such as tablets, capsules, injectables or the like by incorporating the appropriate dose of the compounds with carriers according to accepted pharmaceutical practice.

The compounds of this invention are prepared by a series of reactions as shown by the following equations, wherein $R_1$, $R_2$, A and B are as hereinbefore defined:

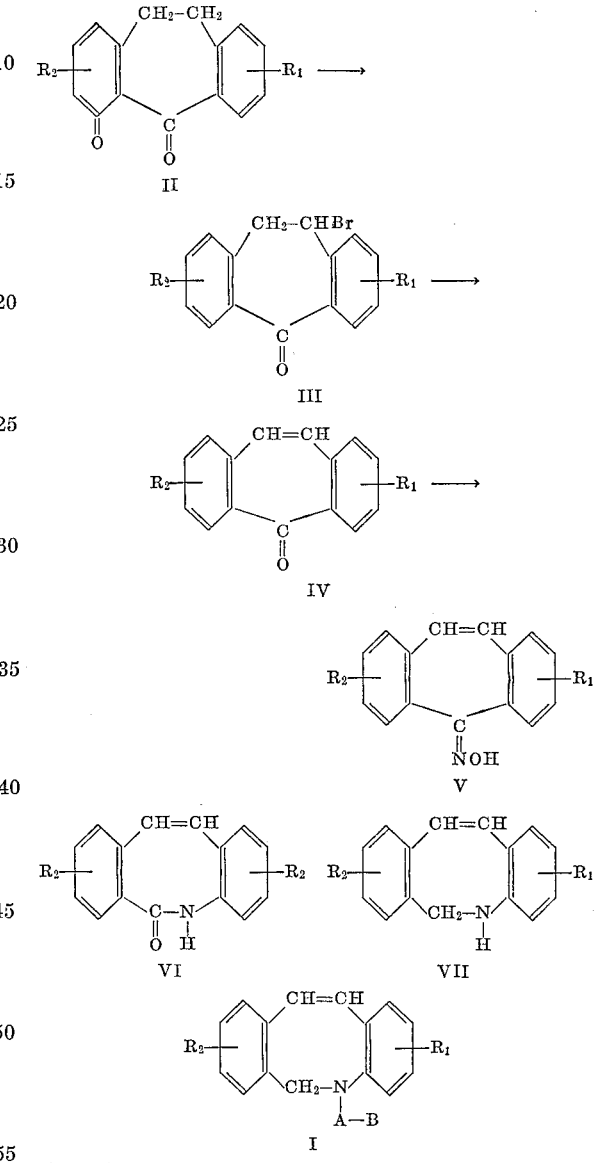

The substituted 10,11-dihydro-5H-dibenzo[a,d]cyclohepten-5-ones (compounds II) which are useful as initial products for preparing the compounds of this invention are described in Journal of Medicinal and Pharmaceutical Chemistry, 4, 335 (1961).

Among the suitable dihydrodibenzocycloheptenones as initial reagents in these reactions may be mentioned: 10,11-dihydro-5H-dibenzo[a,d]cyclohepten-5-one; halodihydrodibenzocycloheptenones, such as 1-, 2-, 3- and 4-chloro-10,11-dihydro-5H-dibenzo[a,d]cyclohepten-5-one and 1-, 2-, 3-, and 4-bromo-10,11-dihydro-5H-dibenzo[a,d]cyclohepten-5-one; (lower alkyl)substituted dihydrodibenzocycloheptenones, such as 1-, 2-, 3- and 4-methyl-10,11-dihydro-5H-dibenzo[a,d]cyclohepten-5-one; 1-, 2-, 3- and 4-ethyl-10,11-dihydro-5H-dibenzo[a,d]cyclohepten-5-one; 1-, 2-, 3- and 4-isopropyl-10,11-dihydro-5H-dibenzo[a,d]cyclohepten-5-one; 1-, 2-, 3- and 4-tert.butyl-10,11- dihydro - 5H - dibenzo[a,d]cyclohepten-5-one; and 2,4-, 3,6-, 3,9 - dimethyl-10,11-dihydro-5H-dibenzo[a,d]cyclohepten-5-one.

In the initial reaction of the process of this invention, the dihydrodibenzocycloheptenones (II) are reacted first with a brominating agent such as molecular bromine, N-bromosuccinimide, N-bromoacetamide, and the like, this reaction preferably being carried out in a solvent like carbontetrachloride or chloroform, whereby III are formed. The III are then treated with pyridine, triethylamine, N-methylmorpholine or like tertiary bases, either alone or in a solvent like toluene, to give IV. The IV are reacted with a salt of hydroxylamine, the reaction preferably being conducted in the presence of a solvent such as pyridine, whereby the corresponding oximes (compounds V) are formed, which are novel compounds of this invention. The oximes are then subjected to a Beckmann rearrangement by treatment with an agent such as polyphosphoric acid. The azocinones (compounds VI) formed, which are novel compounds of this invention, are then reduced to the corresponding azocines (compounds VII), which are also novel compounds of this invention, by treatment with a reducing agent such as lithium aluminum hydride in an organic solvent such as ether or tetrahydrofuran.

Compounds VII are then treated with a basically substituted alkylhalide of the formula: B-A halide, wherein B and A are as hereinabove defined, the reaction preferably being conducted in the presence of a basic condensation reagent such as sodamide. The same compounds can alternatively be prepared in two steps, by first reacting with an alkylene dihalide of the formula: (halide-A-halide) and then with a base of the formula: BH.

Another, and preferred, process for preparing the compounds of this invention from the azocines (compounds VII) consists in treating them with a basically substituted acyl halide of the formula: B-A'-CO-(halide), wherein B is as hereinbefore defined, A' is a lower alkylene radical of at least one carbon atom, and the halide is preferably chloro or bromo, whereby the new intermediates of this invention of Formula VIII are formed:

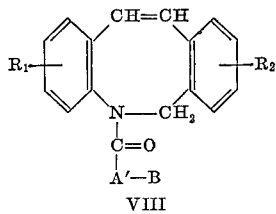

VIII wherein $R_1$, $R_2$, A' and B are as hereinbefore defined. The reaction is preferably conducted in the presence of a basic condensation reagent, such as sodamide and potassium carbonate.

Compounds VII can also be prepared in two steps from compounds VII by first reacting compound VII with a halo acid halide of the formula: (Halide)-OC-A'(halide), wherein A' is as hereinbefore defined and the halides are preferably chloro or bromo, thereby yielding new intermediates of this invention of the Formula IX:

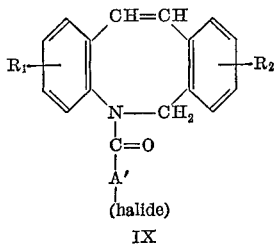

IX wherein $R_1$, $R_2$ and A' are as hereinbefore defined, and reacting the intermediates (compounds IX) with a base of the formula: BH, wherein B is as hereinbefore defined.

Compounds VIII thus obtained, are then reduced with a reducing agent, such as lithium aluminum hydride, to yield the final products of this invention (compounds I).

To prepare the acid-addition salts, the resulting base is treated with the desired acid in the usual manner.

If a substituted dihydrodibenzocyclohepten - 5 - one is used as a a reactant in the above series of reactions the position of the substituent on the resulting azocinone and therefore on the fiinal product will depend on the results of the oximation, two oximes being feasible viz. a synoxime and an antioxime, leading to two different azocinones. Thus, where a 3-substituted dibenzocycloheptenone is interacted upon by hydroxylamine and the oximes produced are then subjected to treatment with agents provoking Beckmann rearrangement, a mixture of 3- and 8-substituted dibenz[b,f]-axocin-6-ones is obtained. These products are then separated by fractional crystallization and the separated products subjected to the remaining steps of the process of this invention. Similarly, a 2-substiuted dibenzocycloheptenone yields a mixture of 2- and 9-substituted dibenz-[b,f]azocin-6-ones, and a 1-substituted dibenzocycloheptenone yields a mixture of 1- and 10-substituted dibenz[b,f]azocin-6-ones.

In addition to their use as intermediates, compounds VIII, as well as the nontoxic acid-addition salts thereof (formed as described hereinbefore for the final products), are therapeutically active compounds which are utilizable as anti-allergic, anticholinergic and analgesic agents. For these purposes they may be administered orally or parenterally in conventional dosage forms such as tablets, capsules, injectables or the like by incorporating the appropriate dose of the compound with carriers according to accepted pharmaceutical practice.

The following examples illustrate the invention (all temperatures being in centigrade). The first example illustrates the preparation of the intermediate compounds VII, as well as its reaction with a B-A-halide to give the final compounds of this invention. The remaining examples are directed to alternative methods of preparation of the final compounds of this invention.

EXAMPLE 1

5-(3-dimethylaminopropyl)-5,6-dihydrodibenz[b,f] azocine-dihydrochloride (a) Preparation of dibenzo[a,d]cyclohepten - 5-one.—A mixture of 128.9 g. of 10,11-dihydrodibenzo[a,d]-cyclohepten-5-one, 110.0 g. of N-bromosuccinimide, and 750 ml. of carbontetrachloride is stirred and heated under reflux for 18 hours. The reaction mixture is filtered and the filtrate concentrated to give a residue of 10-bromo-10,11-dihydrodibenzo[a,d]cyclohepten-5-one. This is dissolved in 193 ml. of pyridine and stirred and heated under reflux for 2 hours and poured into cold dilute hydrochloric acid. The product is filtered and dried to give about 78.4 g. (61%) of dibenzo[a,d]cyclohepten - 5 - one, M.P. about 89–91°.

(b) Preparation of dibenzo[a,d]cyclohepten - 5 - one oxime.—A mixture of 20 g. of the product from (a), 10 g. of hydroxylamine hydrochloride and 60 ml. of pyridine is heated under reflux for 20 hours. The pyridine is partially removed, the residue poured into dilute hydrochloric acid and petroleum ether is added. The mixture is allowed to cool in a refrigerator for two hours and the solid crystalline produce is filtered off and dried. After crystallization from petroleum ether, 11 grams (46%) of a product melting at about 187–188° is obtained.

(c) Preparation of dibenzo[b,f]azocin - 6 - one.—To 1400 g. of stirred polyphosphoric acid at 100° is added 39.7 g. of the product from (b). The temperature is raised to 125° during 0.25 hour, maintained at 125° for 0.5 hour and the mixture poured into ice water. The solid is filtered, washed and dried to give about 35.7 g. (90%) of product, M.P. about 263–264° (dec.).

(d) Preparation of 5,6 - dihydrodibenz[b,f]azocine.—(1) Reduction of dibenzo[b,f]azocin-6-one: To 11.4 g. of lithium aluminum hydride in 1000 ml. of anhydrous ether is added 22.1 g. of the product from (c) in small portions. The mixture is heated under reflux for 12 hours, decomposed and filtered. The filtrate is dried and concentrated to give 20 g. of crude product. Recrystallization from petroleum ether yields about 16.4 g. of product (79%) melting about 108–109°.

(e) Preparation of 5-(3-dimethylaminopropyl)-5,6-dihydro-dibenz[b,f]azocine.—A mixture of 12.4 g. of 5,6-dihydrodibenz[b,f]azocine, 2.9 g. of sodamide and 400 ml. of anhydrous xylene is stirred and heated under reflux for 1 hour, cooled, 12.1 g. of 3-dimethylaminopropyl chloride added dropwise and heating continued for 5 hours. The mixture is filtered, the filtrate cooled and extracted with 500 ml. of 5% hydrochloric acid. The acid solution is treated with an excess of solid potassium carbonate and the base separated by means of ether. The ether solution is dried, concentrated and the residue distilled to give about 11.6 g. (66%) of 5-(3-dimethylaminopropyl)-5,6-dihydrodibenz[b,f]azocine, B.P. about 162–164° (0.08 mm.).

(f) Preparation of 5 - (3 - dimethylaminopropyl)-5,6-dihydrodibenz[b,f]azocine dihydrochloride.—To an ice-cooled solution of 11.2 g. of the product from (e) in 150 ml. of anhydrous ether is added dropwise 24.1 ml. of 3.65 N ethereal hydrogen chloride. The solid is triturated in acetone and recrystallized from acetonitrile-ether to give about 10.0 g. (71%) of 5-(3-dimethylaminopropyl)-5,6 - dihydrodibenz[b,f]azocine dihydrochloride, M.P. 188–189° (dec.).

Similarly, by substituting an equivalent amount of the following substituted 10,11 - dihydrodibenzo[a,d]cyclohepten - 5 - ones for the 10,11-dihydrodibenzo[a,d]cyclohepten-5-one in step (a) of Example I, the indicated substituted 5-(3 - dimethylaminopropyl) - 5,6 - dihydrodibenz[b,f]azocines are formed:

| Substituted 10,11-dihydrodibenzo[a,d]cycloheptene-5-one: | Substituent in product |
|---|---|
| 1-chloro | 1- and 10-chloro. |
| 2-chloro | 2- and 9-chloro. |
| 3-methyl | 3- and 8-methyl. |
| 4-tertiary butyl | 4- and 7-tertiary butyl. |
| 4-bromo | 4- and 7-bromo. |
| 1-ethyl | 1- and 10-ethyl. |
| 2-isopropyl | 2- and 9-isopropyl. |

EXAMPLE 2

5-(2-morpholinoethyl)-5,6-dihydrodibenz[b,f]azocine oxalate (a) Preparation of 5 - (2-chloroacetyl)-5,6-dihydrodibenz[b,f]azocine.—A mixture of 4.2 g. of 5,6-dihydrodibenz[b,f]azocine, 2.3 g. of chloroacetyl chloride, 2.8 g. of potassium carbonate and 100 ml. of xylene is heated under reflux for three hours. The mixture is cooled and filtered. The xylene is distilled under reduced pressure and the residue is recrystallized from petroleum ether to yield about 5 g. of 5-chloroacetyl-5,6-dihydrodibenz[b,f]azocine.

(b) Preparation of 5 - (2-morpholinoacetyl)-5,6-dihydrodibenz[b,f]azocine, hydrochloride.— A mixture of 6 g. of the product from (a), 3.5 g. of morpholine and 50 ml. of alcohol is heated under reflux for 10 hours. The alcohol is removed and the residual oil treated with ether and sodium bicarbonate solution. The ether is separated, dried and an ethereal solution of hydrogen chloride added. The precipitated salt is filtered off to yield about 4.5 g. of crude product.

By recrystallization from a mixture of acetone and petroleum ether 3 g. (38%) of pure product is obtained.

(c) Preparation of 5 - [2-(morpholinoethyl)-5,6-dihydrodibenz[b,f]azocine.—A mixture of 7 g. of the product from (b), 1.5 g. of lithium aluminum hydride and 150 ml. of anhydrous ether is heated and stirred for 16 hours. The mixture is decomposed, the ether layer separated, dried and concentrated to give 5 g. of an oil; this, in ether and an ethereal solution of oxalic acid gives the crude oxalate. Recrystallization from methanol gives 5 g. (58%) of pure 5 - (2 - morpholinoethyl)-5,6-dihydrodibenz[b,f]azocine oxalate.

Similarly, by substituting an equivalent amount of the following substituted 5,6-dihydrodibenz[b,f]azocines for the 5,6-dihydrodibenz[b,f]azocine in Example 2, step (a), and following the procedure of Example 2, the indicated substituted base and oxalic acid salt are formed:

| Substituted 5,6-dihydrodibenz-[b,f]azocine: | Substituent in product |
|---|---|
| 1-chloro | 1-chloro. |
| 2-chloro | 2-chloro. |
| 3-methyl | 3-methyl. |
| 4-tertiary butyl | 4-tertiary butyl. |
| 4-bromo | 4-bromo. |
| 1-ethyl | 1-ethyl. |
| 2-isopropyl | 2-isopropyl. |
| 9-chloro | 9-chloro. |
| 7-tertiary butyl | 7-tertiary butyl. |

EXAMPLE 3

5-(2-piperidinoethyl)-5,6-dihydrodibenz[b,f]azocine oxalate (a) Preparation of 5-(2-piperidinoacetyl)-5,6-dihydrodibenz[b,f]azocine.—A mixture of 5.7 g. of the product from Example 2 (a), 2 g. of piperidine and 50 ml. of alcohol is reacted as in Example 2 (b) to yield about 3.5 g. of 5 - (2-piperidinoacetyl)-5,6-dihydrodibenz[b,f]azocine.

(b) 5 - (2 - piperidinoethyl) - 5,6 - dihydrodibenz[b,f]azocine oxalate.—A mixture of 5 g. of the product from (a), 1.5 g. of lithium aluminum hydride and 50 ml. of anhydrous ether is reacted as in Example 2 (c) to give about 4.5 g. of 5-(2-piperidinoethyl)-5,6-dihydrodibenz[b,f]azocine oxalate.

Similarly, by substituting an equivalent amount of the following substituted 5,6-dihydrodibenz[b,f]azocines for the 5,6-dihydrodibenz[b,f]azocine in Example 3, step (a), and following the procedure of Example 3, the indicated substituted base and oxalic acid salt are formed:

| Substituted 5,6-dihydrodibenz-[b,f]azocine: | Substituent in product |
|---|---|
| 1-chloro | 1-chloro. |
| 2-chloro | 2-chloro |
| 3-methyl | 3-methyl. |
| 4-tertiary butyl | 4-tertiary butyl. |
| 4-bromo | 4-bromo. |
| 1-ethyl | 1-ethyl. |
| 2-isopropyl | 2-isopropyl. |
| 9-chloro | 9-chloro. |
| 7-tertiary butyl | 7-tertiary butyl. |
| 8-methyl | 8-methyl. |

EXAMPLE 4

5-(3-morpholinopropyl)-5,6-dihydrodibenz[b,f]azocine maleate (a) 5 - (3-chloropropionyl)-5,6-dihydrodibenz[b,f]azocine.—A mixture of 8.3 g. of 5,6-dihydrodibenz[b,f]azocine, 5.1 g. of β-chloropropionyl chloride and 5.6 g. of potassium carbonate in 100 ml. of benzene is heated under reflux for three hours. The mixture is cooled and filtered. The benzene is distilled to yield 10 grams (95%) of 5-(3-chloropropionyl)-5,6-dihydrodibenz[b,f]azocine.

(b) Preparation of 5-(3-morpholinopropyl)-5,6-dihydrodibenz[b,f]azocine oxalate.—A mixture of 6 g. of the product from (a), 3.5 g. of morpholine and 50 ml. of alcohol is reacted as in Example 2 (b) to yield about 5.5 g. of 5 - (3 - morpholinopropyl)-5,6-dihydrodibenz[b,f]azocine.

(c) Preparation of 5-(3-morpholinopropyl)-5,6-dihydrodibenz[b,f]azocine maleate.—A mixture of 3.3 g. of the product from (b), 0.75 gram of lithium aluminum hydride and 100 ml. of anhydrous ether is reacted as in Example 2 (c). The ether solution of the basic product is treated with an ethereal solution of maleic acid to yield about 4 g. (89%) of pure 5-(3-morpholinopropyl)-5,6-dihydrodibenz[b,f]azocine maleate.

EXAMPLE 5

5-(3-dimethylaminopropyl)-5,6-dihydrodibenz[b,f]azocine oxalate (a) 5 - (3 - dimethylaminopionyl) - 5,6-dihydrodibenz[b,f]azocine.—From 6 g. of the product from 4 (a), 2.5 g. of dimethylamine and 50 ml. of alcohol by the procedure of Example 2 (b), there is obtained 5-(3-dimethylaminopropionyl)-5,6-dihydrodibenz[b,f]azocine.

(b) Preparation of 5-(3-dimethylaminopropyl)-5,6-dihydrodibenz[b,f]azocine oxalate.—From 4.6 g. of the product from (a), 1.4 g. of lithium aluminum hydride and 50 ml. of anhydrous ether, by the procedure of Example 2 (c), there is obtained about 3.4 g. of 5-(3-dimethylaminopropyl)-5,6-dihydrodibenz[b,f]azocine oxalate.

EXAMPLE 6

5-(3-piperidinopropyl)-5,6-dihydrodibenz[b,f]azocine hydrochloride (a) Preparation of 5-(3-piperidinopropionyl)-5,6-dihydrodibenz[b,f]azocine.—A mixture of 6.0 g. of the product from 4 (a), 2.5 g. of piperidine and 50 ml. of alcohol is reacted by the procedure of Example 2 (b). The free base is converted into the oxalate salt in the usual manner.

(b) Preparation of 5-(3-piperidinopropyl)-5,6-dihydrodibenz[b,f]azocine hydrochloride.—From a mixture of 3.5 g. of the product from (a), 1.0 g. of lithium aluminum hydride and 50 ml. of anhydrous ether, about 2.7 grams of 5-(3-piperidinopropyl)-5,6-dihydrodibenz[b,f]azocine hydrochloride are obtained.

EXAMPLE 7

5-[3-(N⁴-methylpiperazino)propyl]-5,6-dihydrodibenz[b,f]azocine dihydrochloride (a) Preparation of 5 - [3 - (N⁴-methylpiperazino)propionyl] - 5,6-dihydrodibenz[b,f]azocine hydrochloride.—From a mixture of 6.0 g. of the product from 4 (a), 3.0 grams of N-methylpiperazine and 50 ml. of alcohol, according to the procedure described in Example 2 (a) is obtained 5-[3-(N⁴-methylpiperazino)propionyl]-5,6-dihydrodibenz[b,f]azocine. This base is converted into a salt with 1 mole of hydrochloric acid.

(b) Preparation of 5-[3-(N⁴-methylpiperazino)propyl]-5,6-dihydrodibenz[b,f]azocine dihydrochloride.—From a mixture of 7.3 grams of the base from (a), 1.8 grams of lithium aluminum hydride and 70 ml. of anhydrous tetrahydrofuran, there is obtained 3.0 grams of the dihydrochloride of 5-[3-(N⁴-methylpiperazino)propyl]-5,6-dihydrodibenz[b,f]azocine.

EXAMPLE 8

5-[3-(N⁴-methylhomopiperazino)ethyl]-5,6-dihydrodibenz[b,f]azocine dimaleate (a) Preparation of 5-[3-(N⁴-methylhomopiperazino)acetyl]-5,6-dihydrodibenz[b,f]azocine maleate.—By substituting an equivalent amount of N⁴-methylhomopiperazine for the morpholine in Example 2 (b), there is obtained 5-[3-(N⁴-methylhomopiperazino)acetyl]-5,6-dihydrodibenz[b,f]azocine. The base, in acetone, with an acetone solution of maleic acid, gives the maleate.

(b) Preparation of 5-[3-(N⁴-methylhomopiperazino)ethyl]-5,6-dihydrodibenz[b,f]azocine dimaleate.—By substituting an equivalent amount of the product from (a) for the 5 - (2-morpholinoacetyl)-5,6-dihydrodibenz[b,f]azocine in Example 2 (c), there is obtained 5-[3-(N⁴-methylhomopiperazino)ethyl] - 5,6 - dihydrodibenz[b,f]azocine. This base with maleic acid, as in (a) gives the maleate salt.

EXAMPLE 9

5-(3-methylaminopropyl)-5,6-dihydrodibenz[b,f]azocine maleate (a) Preparation of 5-(3-methylaminopropionyl)-5,6-dihydrodibenz[b,f]azocine.—By replacing the 2.5 g. of dimethylamine in Example 5 (a) with 6.2 g. of methylamine and proceeding as in Example 3 (a), there is obtained 2.3 g. of 5-(3-methylaminopropionyl)-5,6-dihydrodibenz[b,f]azocine.

(b) Preparation of 5-(3-methylaminopropyl)-5,6-dihydrodibenz[b,f]azocine.—Substituting 4.4 g. of the product from (a) for the 4.6 g. of 5-(3-dimethylaminopropionyl)-5,6-dihydrodibenz[b,f]azocine and maleic acid for the oxalic acid in Example 5 (b), there is obtained 5 - (3-methylaminopropyl)-5,6-dihydrodibenz[b,f]azocine maleate, M.P. 112–114°.

This invention may be variously otherwise embodied within the scope of the appended claims.

What is claimed is:

1. A compound of the formula

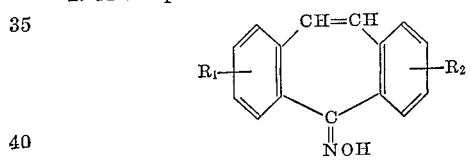

wherein $R_1$ and $R_2$ are each selected from the group consisting of hydrogen, halogen and lower alkyl.

2. A compound in accordance with claim 1 having the name dibenzo[a,d]cyclohepten-5-one oxime.

References Cited

UNITED STATES PATENTS 3,349,128  10/1967  Judd _____ 260—566

OTHER REFERENCES

Mayer, Roland: Chemische Berichte, vol. 90, pp. 2362–2369 (1957).

Bryant et al.: J. Am. Chem. Soc. 57, 57 (1935).

McElvair: The Characterization of Org. Comp., 1947, p. 198.

Shriner et al.: Identification of Organic Compounds, 1948, pp. 201–3.

BERNARD HELFIN, Primary Examiner

G. A. SCHWARTZ, Assistant Examiner